United States Patent
Laramy et al.

(10) Patent No.: US 8,682,719 B2
(45) Date of Patent: Mar. 25, 2014

(54) REWARDS PROGRAM MANAGER

(75) Inventors: Jodene Laramy, San Francisco, CA (US); Shaun Bodington, San Leandro, CA (US); Paula Marie Johnson-Alosi, San Mateo, CA (US); Denise Nay O'Brien, Ashburn, VA (US)

(73) Assignee: Visa U.S.A. Inc., San Francisco, CA (US)

( * ) Notice: Subject to any disclaimer, the term of this patent is extended or adjusted under 35 U.S.C. 154(b) by 851 days.

(21) Appl. No.: 11/688,423

(22) Filed: Mar. 20, 2007

(65) Prior Publication Data

US 2008/0195473 A1 Aug. 14, 2008

Related U.S. Application Data

(60) Provisional application No. 60/901,543, filed on Feb. 14, 2007.

(51) Int. Cl.
*G06Q 30/00* (2012.01)
*G05B 19/418* (2006.01)

(52) U.S. Cl.
USPC .................. 705/14.34; 705/14.1; 705/16

(58) Field of Classification Search
USPC ............................ 705/14, 14.1, 16, 14.34
See application file for complete search history.

(56) References Cited

U.S. PATENT DOCUMENTS

| | | | |
|---|---|---|---|
| 5,774,870 A | 6/1998 | Storey | |
| 5,920,847 A | 7/1999 | Kolling et al. | |
| 6,549,912 B1 | 4/2003 | Chen | |
| 6,808,111 B2 | 10/2004 | Kashef et al. | |
| 6,837,425 B2 | 1/2005 | Gauthier et al. | |
| 6,920,611 B1 | 7/2005 | Spaeth et al. | |
| 7,051,923 B2 | 5/2006 | Nguyen et al. | |
| 7,054,830 B1 * | 5/2006 | Eggleston et al. | 705/14 |
| 7,104,446 B2 | 9/2006 | Bortolin et al. | |
| 7,121,456 B2 | 10/2006 | Spaeth et al. | |
| 7,152,780 B2 | 12/2006 | Gauthier et al. | |
| 2001/0051935 A1 * | 12/2001 | Sugiura | 706/12 |
| 2003/0036952 A1 | 2/2003 | Panttaja et al. | |
| 2003/0233278 A1 * | 12/2003 | Marshall | 705/14 |
| 2004/0019522 A1 | 1/2004 | Bortolin et al. | |
| 2004/0050922 A1 | 3/2004 | Gauthier et al. | |
| 2004/0054590 A1 | 3/2004 | Redford et al. | |
| 2004/0148224 A1 | 7/2004 | Gauthier et al. | |

(Continued)

FOREIGN PATENT DOCUMENTS

| | | |
|---|---|---|
| WO | WO 00/21008 A1 | 4/2000 |
| WO | WO 01/13563 A2 | 2/2001 |

OTHER PUBLICATIONS

"IBM initiates Premier Partner program; top 10 percent of midrange marketers expected to qualify for special offerings. (Premier Business Partner Program)" Midrange Systems , v5 , n16 , p1(2). Aug. 18, 1992.*

*Primary Examiner* — Victoria Vanderhorst
(74) *Attorney, Agent, or Firm* — Kilpatrick Townsend & Stockton LLP

(57) ABSTRACT

A method for managing rewards programs is disclosed. The method includes reviewing a plurality of offers from a plurality of merchants on a host site via the Internet. The offers are associated with rewards to consumers after the consumers use their portable consumer devices. An offer from the plurality of offers is selected and a customized offer element including the offer and an identifier of an issuer that selected the offer is generated.

20 Claims, 21 Drawing Sheets

(56) References Cited

U.S. PATENT DOCUMENTS

| | | |
|---|---|---|
| 2004/0153715 A1 | 8/2004 | Spaeth et al. |
| 2004/0181453 A1* | 9/2004 | Ray et al. .................... 705/16 |
| 2005/0021456 A1 | 1/2005 | Steele et al. |
| 2005/0045718 A1 | 3/2005 | Bortolin et al. |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0121506 A1 | 6/2005 | Gauthier et al. |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2007/0001000 A1 | 1/2007 | Nguyen et al. |
| 2007/0012764 A1 | 1/2007 | Bortolin et al. |
| 2007/0017970 A1 | 1/2007 | Gauthier et al. |
| 2007/0034679 A1 | 2/2007 | Gauthier et al. |
| 2007/0057034 A1 | 3/2007 | Gauthier et al. |
| 2007/0057051 A1 | 3/2007 | Bortolin et al. |
| 2007/0094080 A1* | 4/2007 | Wiken .......................... 705/14 |
| 2008/0027797 A1* | 1/2008 | Joshi et al. .................. 705/14 |
| 2008/0177589 A1* | 7/2008 | Durvasula et al. ............ 705/7 |

* cited by examiner

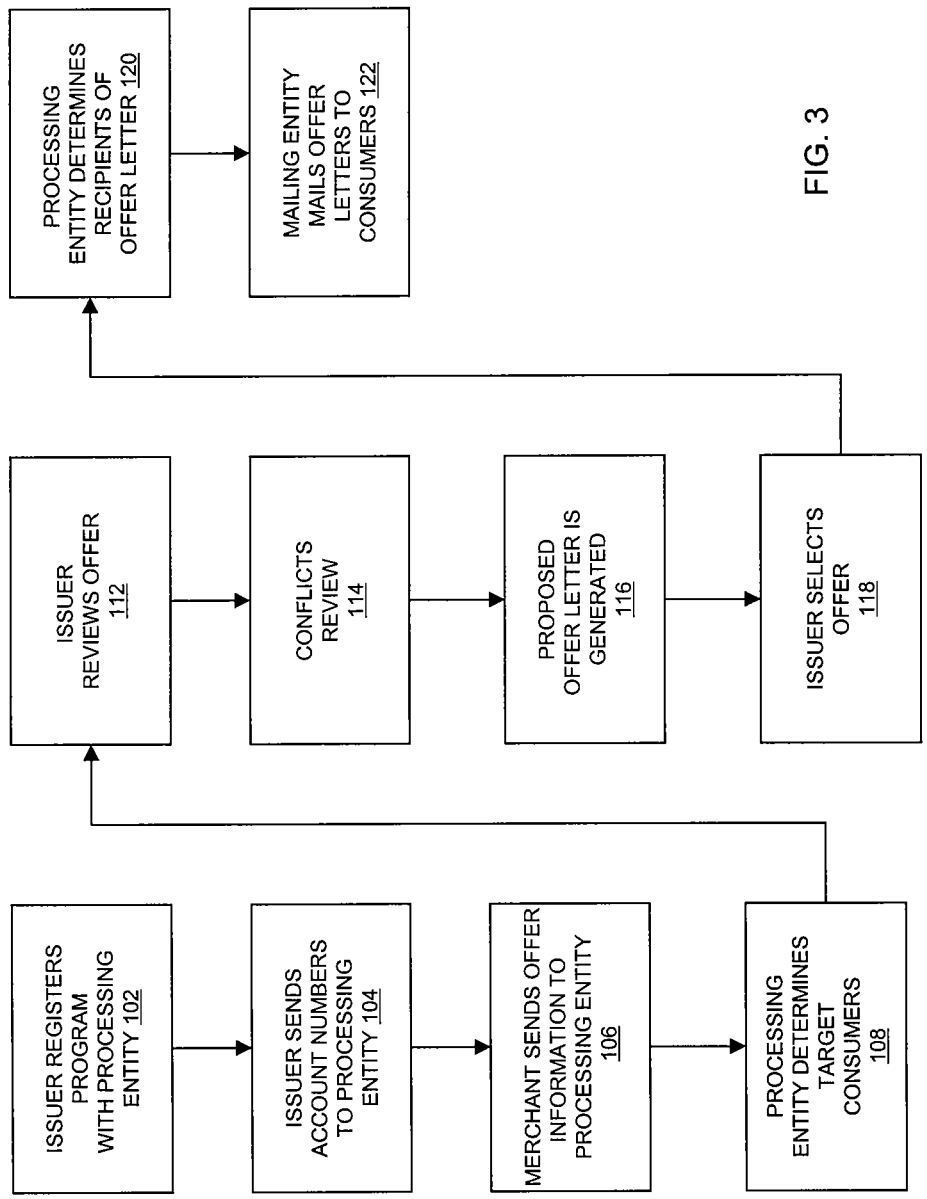

Visa Incentive Network
Rewards Program Manager

VISA

Change Context

Home

My Business Entity

Partners

Programs

Program Brands

Account Ranges

Seeds

Contact

Offer Participation

Advanced Views

Users

Search

Edit: Big Bank

Big Bank

Introduction
Details
Branding
Account Ranges
Mailing Seeds
Summary

Registering Entity Legal

Details                                    Step 1 of 4

Active                          ☑

Legal Name                      | Big Bank |

Business Name                   | Bank Name VI |

BID (Visa Business ID)          | 12345678 |

Business Reference ID           | 987654 |

Business Type                   | Issuer ▼ |

Address                         | 123 Street Avenue | ◄ ►

City                            | City |

State                           | California (CA) ▼ |

Zip Code                        | 94444 |

Document Downloads:
☑ VIN Issuer Participation Agreement

[Previous]  [Save & Continue]  [Cancel]

Visa Incentive Network
Rewards Program Manager

VISA

Welcome to the Rewards Program Manager

Big Bank

206

My Activities

| Created | Activity | Status |
|---|---|---|
| 5/18/2006 | Request for Branding approval due to change: Bank Name | Pending |

Activity Manager | View/Print All Activities

My Reminders

Visa Incentive Network News

Visa Signature Privileges for Winter 2006

Use the Visa Signature Privileges Winter 2006 program to reward your most valued cardholders with exceptional offers. They can enjoy special upgrades, discounts, and VIP privileges from an array of fine hotels and resorts, upscale retailers, and travel providers. The Winter 2006 program, which you can access using the link below, makes it easy to create seasonal promotional materials targeted toward your most affluent customers. More >>>

All News Items

Scheduled Offers

| Apr | May | Jun | Jul | Aug | Sep | Oct | Nov | Dec | Jan | Feb | Mar | Apr |
|---|---|---|---|---|---|---|---|---|---|---|---|---|

Merchant Offer 401 5/1/2005 - 6/19/2006
Gasoline 11/9/2005 - 6/27/2006
■ Tickets 11/1/2006 - 11/1/2006

202

| Dates | Offer | Reminders |
|---|---|---|
| 6/2/2006 | Merchant Offer 401 | Offer List of Participating Accounts |
| 6/5/2006 | Merchant Offer 401 | Offer Creative Preview Available |
| 6/9/2006 | Merchant Offer 401 | Printing Date |
| 6/12/2006 | Merchant Offer 401 | Mail Drop |
| 6/12/2006 | Merchant Offer 401 | Redemption Period Begin Date |
| 6/19/2006 | Merchant Offer 401 | Redemption Period End Date |
| 6/27/2006 | Gasoline | Offer Performance Report |
| 11/1/2006 | ■ Tickets | Mail Drop |

Sidebar: Change Context, Home, My Business Entity, Partners, Programs, Program Brands, Account Ranges, Seeds, Contact, Offer Participation, Advanced Views, Users, Search, My Profile

Visa Incentive Network
Rewards Program Manager

VISA

Big Bank

Change Context

Home

Activity Manager

My Business Entity

Activity Listing:

Partners

| | Created | Activity | Status |
|---|---|---|---|
| | 05/18/2006 | Request for Branding approval due to change: Bank Name | Pending |

Programs

Program Brands

Account Ranges

Seeds

Contact

1

Page 1 of 1 (1 items)

FIG. 8

Reports

Registration Summary Report

Offer Participation Report

Program Report

Partner Report

Account Ranges Report

VIN Calendar

Program Brand Branding and Participation Summary Report

FIG. 10

Visa Incentive Network
Rewards Program Manager

VISA

Change Context

Home

Big Bank

My Business Entity

Edit: Visa Extras (Traditional Rewards)

Step 1 of 10

Partners

| Introduction | Details |
| Details | Active |
| Metrics | |
| Assign Contacts | Who will administer this rewards program? |

Programs

Reward Details
Bonus & Redemption    ⊙ Business Entity

Program Brands

Catalog & Currency    ○ Third-party Rewards Provider

Reward Redemption

Account Ranges

Redemption Detail     ○ Visa Extras  ❓

Seeds

Branding

Big Bank ▾

Add New Contact ▾  ❓

FIG. 11

Visa Incentive Network
Rewards Program Manager

Big Bank

VISA

| | Edit: Big Bank Rewards (Signature Rewards) | | Step 1 of 10 |
|---|---|---|---|

Change Context
Home
My Business Entity
Partners
Programs
Program Brands
Account Ranges
Seeds
Contact
Offer Participation
Advanced Views
Users Introduction
Details
Metrics
Assign Contacts
Reward Details
Bonus & Redemption
Catalog & Currency
Reward Redemption
Redemption Detail
Branding
Account Ranges
Summary Details Active Who will administer this rewards program?

⦿ Business Entity

○ Third-party Rewards Provider ❷

○ Visa Extras ❷

Rewards Program Details

Rewards Program Name (for example, Visa Extras)

Program Product Type

Rewards Currency Name (for example, Visa Extras Rewards Points)

[Big Bank ▾]

Add New Contact

[▾] ❷

[Big Bank Rewards]

[Signature Rewards ▾]

[Big Rewards Points ▾] ❷

FIG. 12

Visa Incentive Network
Rewards Program Manager

VISA

Big Bank

Edit: Visa Extras (Traditional Rewards)

Step 4 of 10

Change Context
Home
My Business Entity
Partners
Programs
Program Brands
Account Ranges
Seeds
Contact
Offer Participation Introduction
Details
Metrics
Assign Contacts
Reward Details
Bonus & Redemption
Catalog & Currency
Reward Redemption
Redemption Detail
Branding
Account Ranges
Summary

Reward Details

Rewards Currency Earning Structure ❓

Is this rewards program tiered?

⦿ No (please specify rewards earn rate)

Spend $1 to Earn [10] Visa Extras Rewards Points ❓

○ Yes - please specify annual rewards earn rate for tiers.

(*25 bps minimum value for Tier 1)

| | Spend ($) | To ($) | Earn | Rewards Currency ❓ |
|---|---|---|---|---|
| Tier 1: | | | | Visa Extras Rewards Points |

FIG. 15

Visa Incentive Network
Rewards Program Manager

Big Bank

VISA

Change Context

Home

My Business Entity

Partners

Programs

Program Brands

Account Ranges

Seeds

Contact

Offer Participation

Advanced Views

Users

Search

My Profile

Edit: Visa Extras (Traditional Rewards)

Step 5 of 10

Introduction
Details
Metrics
Assign Contacts
Reward Details
Bonus & Redemption
Catalog & Currency
Reward Redemption
Redemption Detail
Branding
Account Ranges
Summary

Bonus & Redemption

Does the program provide a bonus for new card sign-up?

⦿ No  ⃝ Yes

Does the program offer bonuses to cardholders for spend in specific categories?

⦿ No  ⃝ Yes (please specify all that apply)

Rewards redemption options

Cardholders enrolled in Issuer's rewards program may redeem for the following rewards: (please select all that apply)

Select All | Clear All

☐ Cash Back
☑ Gift Cards
☐ Gift Certificates
☐ Merchandise

Other

[ Add ]

[ Previous ]  [ Save & Continue ]  [ Cancel ]

FIG. 16

Visa Incentive Network
Rewards Program Manager

Big Bank

VISA

Edit: Visa Extras (Traditional Rewards)                Step 6 of 10

| | |
|---|---|
| Change Context | |
| Home | |
| My Business Entity | Introduction    Catalog & Currency |
| Partners | Details |
| Programs | Metrics    Cardholder rewards catalog |
| Program Brands | Assign Contacts    Cardholders enrolled in Issuer's rewards program may redeem rewards, using: |
| Account Ranges | Reward Details    (please select all that apply) |
| Seeds | Bonus & Redemption    ☑ Phone   ☐ Printed Rewards Catalog   ☐ Mail |
| Contact | Catalog & Currency |
| Offer Participation | Reward Redemption    ☐ Online catalog (provide details below) |
| Advanced Views | Redemption Detail      Site URL: |
| Users | Branding |
| Search | Account Ranges      Requires Validation: ☐ |
| My Profile | Summary      Visa Guest User ID: |
| |      Visa Guest Password: |
| | Cardholder rewards currency notification |
| | Issuer must notify cardholders regularly and at a minimum annually of their rewards currency in compliance with the Rewards Requirements: (please select all that apply): |
| | ☐ Stand-alone communication piece: (please provide details) |
| | Communication channel ☐ Mail ☐ Email ☐ Online |
| | Frequency of communication | N/A ▼ | |

FIG. 17

Visa Incentive Network
Rewards Program Manager                                                                  VISA

| | | Big Bank |
|---|---|---|
| Change Context | Edit: Visa Extras (Traditional Rewards) | Step 7 of 10 |

Home

My Business Entity     Introduction          Reward Redemption

Partners               Details               Qualification of rewards program at meeting 62.5 bps in consumer value per dollar spend
                       Metrics               will be based on one of the following redemption options.
                       Assign Contacts Programs               Reward Details        (Please select one option below)
                       Bonus & Redemption
Program                Catalog & Currency    ○ Air Travel
Brands                 Reward Redemption ● Cash Equivalency
Account                Redemption Detail     ○ Merchant Specific Gift Card
Ranges                                       ○ Merchant Specific Gift Certificate
                       Branding
Seeds                  Account Ranges
                       Summary
Contact Offer
Participation
                                                           Previous | Save & Continue |      Cancel
Advanced
Views

FIG. 18

Visa Incentive Network
Rewards Program Manager

Big Bank
VISA

Edit: Visa Extras (Traditional Rewards)

Step 8 of 10

Change Context

Home

My Business Entity

Partners

Programs

Program Brands

Account Ranges

Seeds

Contact

Offer Participation

Advanced Views

Users

Search

My Profile

Introduction
Details
Metrics
Assign Contacts
Reward Details
Bonus & Redemption
Catalog & Currency
Reward Redemption
Redemption Detail
Branding
Account Ranges
Summary

Redemption Detail

Cash Equivalency redemption options

Issuer must offer at least ONE of the following redemption options to meet the minimum consumer value of 62.5 bps per dollar in qualifying cardholder spend.

(select ONE or more of the following redemption options)

☑ Statement Credit

☐ Check made out to the cardholder

☐ Check made out for cash

Do Checks expire?

○ No ○ Yes - Expires after [ ] ○ Days ○ Months ○ Years

☐ Dollar-denominated general-purpose gift card that has no spending restrictions ❓

Do Gift Cards expire?

○ No ○ Yes - Expires after [ ] ○ Days ○ Months ○ Years

☐ Payment to an affinity group, association, or charity selected by cardholder

Cash Valuation

Option used to value cash redemptions (select ONE of the following redemption options)

FIG. 19

REWARDS PROGRAM MANAGER

CROSS-REFERENCES TO RELATED APPLICATIONS

This patent application is a non-provisional of and claims the benefit of U.S. Provisional Patent Application No. 60/901,543, filed on Feb. 14, 2007, which is herein incorporated by reference in its entirety for all purposes.

BACKGROUND

In recent years, a number of rewards programs have been offered by issuers of portable consumer devices such credit cards. Rewards such as airline miles, cash back, points, etc. can be earned when consumers use their credit cards.

The number of rewards programs offered by issuers has increased significantly in recent years. Some issuers may be running multiple rewards programs simultaneously and it is difficult to keep track of them. Rewards programs have start dates, end dates, and other milestones. Issuers also need better and more efficient ways to initiate, run, and manage rewards programs.

Embodiments of the invention address these and other programs.

BRIEF SUMMARY

Embodiments of the invention are directed to systems and methods for managing rewards programs.

One embodiment of the invention is directed to a method comprising registering a business entity (e.g., an issuer, third party reward processor, etc.) with a rewards program manager, and allowing the business entity to manage multiple rewards programs via a host site.

Another embodiment of the invention is directed to a method comprising providing information to register a business entity (e.g., an issuer) with a rewards program manager, and managing multiple rewards programs via a host site.

Another embodiment of the invention is directed to a method comprising reviewing a plurality of offers from a plurality of merchants on a host site, where the offers are associated with rewards provided to consumers after the consumers use their portable consumer devices. An offer is then selected from the plurality of offers, and a generated customized offer element including the offer and an identifier of a business entity that selected the offer is reviewed.

Another embodiment of the invention is directed to a method comprising providing for a plurality of offers from a plurality of merchants on a host site. The offers are associated with rewards provided to consumers after the consumers use their portable consumer devices. A selection of an offer from the plurality of offers is received, and a customized offer element including the offer and an identifier of a business entity that selected the offer is generated.

Other embodiments of the invention are directed to computer readable media comprising code and systems for performing such methods and other methods.

BRIEF DESCRIPTION OF THE DRAWINGS

FIG. 3 shows a flowchart illustrating a method for registering a business entity and generating a customized offer letter.

FIG. 4 shows a screenshot for allowing an issuer to register with a processing entity's reward management program.

FIG. 5 shows an exemplary offer letter generated according to an embodiment of the invention.

FIG. 7 shows an introductory Web page of a host site according to an embodiment of the invention.

FIG. 8 shows a Web page showing an activity manager.

FIG. 10 shows a Web page with links to reports that can be provided.

FIGS. 11-12 show Web pages for providing details when registering a new rewards program.

FIG. 15 shows a Web page that allows an issuer to provide reward program details.

FIG. 16 shows a Web page that allows an issuer to provide bonus and redemption details.

FIG. 17 shows a Web page that allows an issuer to provide catalog and currency information.

FIG. 18 shows a Web page that allows an issuer to provide reward redemption information about a rewards program.

FIG. 19 shows a Web page that allows an issuer to provide redemption details.

DETAILED DESCRIPTION

Figure 1:
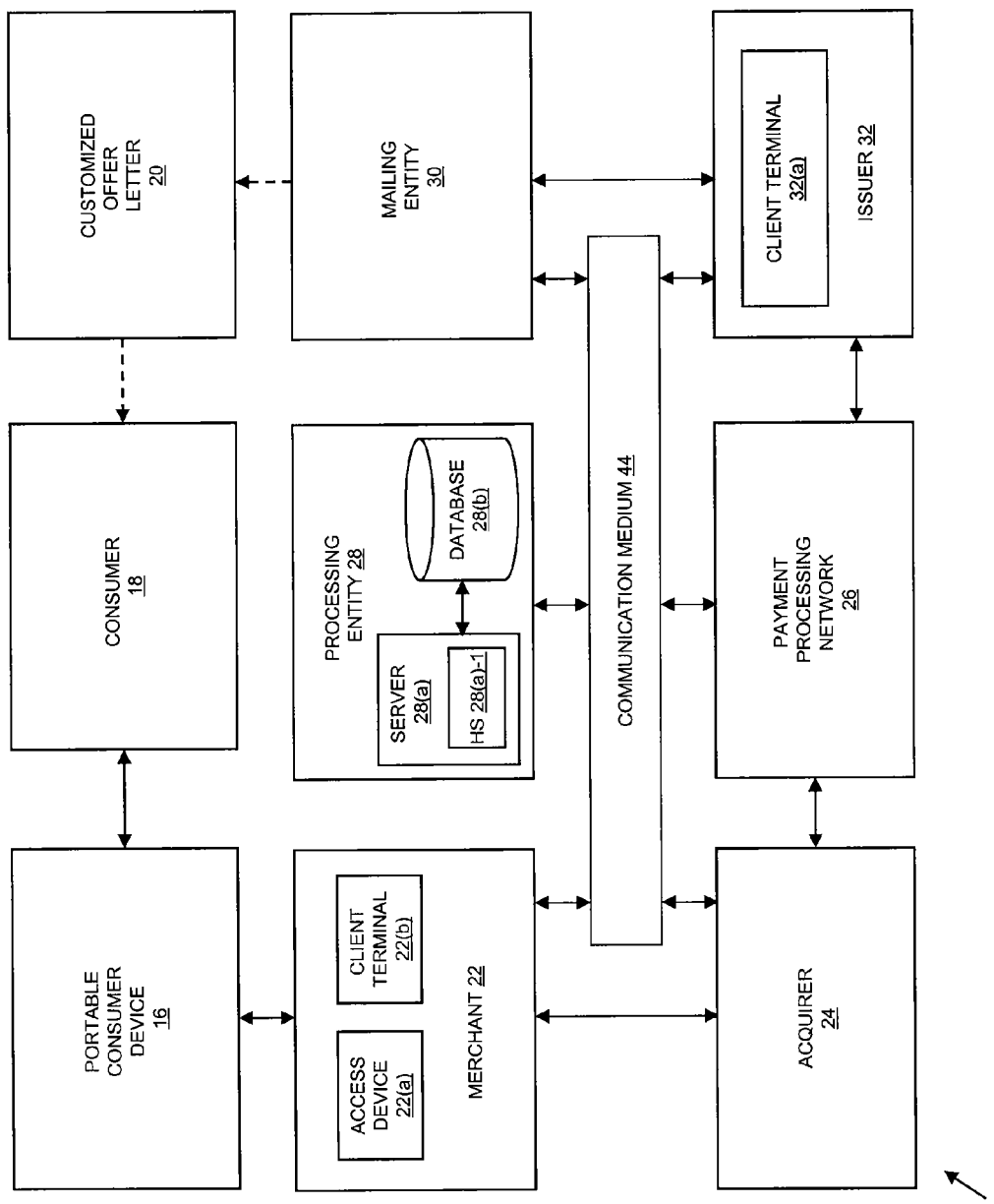
FIG. 1 shows a block diagram of a system according to an embodiment of the invention.

Embodiments of the invention provide an automated online tool that makes it easy to enroll and manage reward programs. In embodiments of the invention, a rewards program manager (RPM) can provide a centralized "dashboard" where a business entity such as an issuer can review a calendar of merchant offers, view templates of current creatives, ensure the accuracy of the business entity's brand and contact information, monitor results, register any promotion conflicts, and enroll new rewards programs.

A self service tool in the RPM can provide business entities such as issuers with greater control in managing and creating their rewards. For example, the RPM offers the ability to: (a) view a calendar that automatically generates key dates and deadlines (e.g., mail drop dates for offers) associated with rewards programs being run by a business entity, (b) register rewards programs and rewards program brands online, (c) add, update and approve branding information, (d) view branding on sample creative templates with actual merchant offers, (e) manage offer participation, and (f) use wizards for creating rewards programs and maintaining program and business entity information.

In one embodiment of the invention, an issuer requests access to an online service offered by a processing entity (e.g., a payment processing organization). The online service operates a rewards program manager that can be used by the issuer. Once access to the online service is granted, the processing organization, which can also serve as a registering entity, can define various entity-specific elements, such as branding and seeds (a seed can be a target consumer). This can be done using a business "wizard." New programs can then be added on a "manage programs" page through the wizard. Once a new rewards program has been created by the business entity, the rewards program is assigned a rewards program identification number (RPIN).

In some embodiments, customized offer elements such as offer letters can be generated using the rewards program manager. For example, in embodiments of the invention, after an issuer has registered a rewards program with the rewards program manager, the issuer can review merchant offers using the online service. An example of a merchant offer might be a free $10 gift card if a consumer uses his rewards-branded credit card at the merchant during a predetermined time period (e.g., during December 2007). Using the online service, the business entity may select one of the merchant offers, and then review (e.g., preview) an offer element (e.g., a letter, an e-mail notice, etc.) with the offer. The offer element may have the logos or other identifiers for the issuer and merchant.

Before or after reviewing the merchant offers, the issuer can send a consumer maintenance file to the processing entity containing all account numbers and other information associated with the rewards program to a processing entity. Other issuers may also send account numbers and other information associated with their rewards programs to the processing entity. Using the pool of consumers, the processing entity may then match a merchant offer with prospective offer recipients from the pool of consumers. For example, issuer A may operate reward program A with consumer group C and issuer B may operate reward program B with consumer group D. Merchant E may have an offer to provide a free $10 gift card to 1000 consumers for purchases made during a particular month. However, Merchant E may only want to target higher income credit cardholders (e.g., "gold" credit cardholders). The processing entity can match the parameters of the merchant offer with appropriate consumers in groups C and D, and issuers A and B may subsequently initiate the sending of the offer elements (e.g., offer letters) to the targeted cardholders.

After the consumers receive their offer elements, consumers can use their portable consumer devices in the manner specified in their offer elements. The issuers can receive fast and accurate feedback regarding the offers that they have chosen to use. For example, for each offer, the processing entity can provide offer results to issuers 60-90 days after the offer ends.

The online service according to embodiments of the invention also provides a dynamic branding engine enabling issuers to update brand assets as needed. An integrated offer calendar is also part of the online service and provides an improved view of upcoming offers and event driven conflict management.

As described in further detail below, once an agreement is signed by an issuer (e.g., other business entity) and is approved by the processing organization, the issuer can proceed to register itself or an associated business through the rewards program manager. The business entity is the highest of the four RPM hierarchy levels, which contains an issuer's legal information, defines its branding elements, and manages account ranges and mailing seeds that can be edited through the rewards program manager.

The business entity can be a registering entity. The business entity can add multiple partners which are at a second hierarchy level that can define issuer, co-brand, or processor relationships.

A business entity can register a rewards program (which is at a third hierarchy level). The registration of a program can meet minimum qualification criteria established by the processing entity. All supporting registration materials and registration forms can be sent to a market implementation department at the processing entity, who can qualify and approve any requests for a new program or changes to an existing rewards program. Reward details of the rewards are required along with contact information, branding elements, BIN and account range information.

When a rewards program is approved by the processing entity, program brands are created and are the lowest level in the hierarchy. To reduce the need of re-enter data elements, one can select an existing partner or program and inherit details such as their logo, branding signature and other elements to create a new program brand.

To facilitate its function, the rewards program manager can have a number of wizards. They may include a business entity wizard, a partners wizard, a program wizard, and a program brand wizard.

The business entity wizard and partners wizard can be used to register and/or edit business entity information, partner information, and other information.

The rewards program wizard can be used by an issuer to register a rewards program. A "program" may correspond closely to the concept of a program "platform". It can be created and maintained by a registering entity, and represents the unique set of rewards program detail data upon which a rewards program can be qualified and approved by the processing entity. Every program brand can be based upon one "program," although a program can serve as the basis for more than one program brand.

The program brand wizard can also be used by an issuer to register a rewards program brand. A "program brand" can correspond to a standalone or child program. A program brand is the level at which an RPIN (rewards program identification number) is assigned. A program brand can inherit the program detail data of its associated program. It may also have other specifically assigned data attributes which apply down to this level, at which branding meets rewards program qualification data.

FIG. 1 (a) shows a system 10 that can be used in an embodiment of the invention. The system 10 includes a merchant 22 and an acquirer 24 associated with the merchant 22. The acquirer 24 can communicate with an issuer 32 via a payment processing network 26. Although one merchant 22, one acquirer 24, one issuer 32, one consumer 18, etc., are shown for ease of illustration in FIG. 1, it is understood that there may be more or less components in other embodiments of the invention than are shown in FIG. 1. When multiple issuers and merchants, and the processing entity are present, an "incentive network" may be formed in some embodiments.

A processing entity 28 may also be in communication with the payment processing network 26. The merchant 22, a mailing entity 30, and the issuer 32 may also be in communication with the processing entity 28 via a communication medium 44.

As shown, the mailing entity 30 may mail a customized offer letter 20 to the consumer 18. While the offer element is preferably in the form of a customized offer letter, in other embodiments, the offer element could be in some other suitable form. For example, customized offer elements may include audio offers, television commercials, as well as customized electronic messages (e.g., HTML ads, e-mails, etc.).

The merchant 22 may have an access device 22(a) for communicating with a portable consumer device 16 used by a consumer 18. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

The merchant 22 may also have a client terminal 22(b) for communicating with the processing entity 28. Suitable client terminals may include standard personal computers which operate using any suitable operating system including a Windows™ based operating system.

The acquirer 24 is typically a bank that has a merchant account. The issuer 32 may also be a bank, but could also be business entity such as a retail store. Some entities are both acquirers and issuers, and embodiments of the invention include such entities. The acquirer 24 and/or the issuer 32 may operate client terminals (e.g., issuer client terminal 32(a)) so that they can communicate with the processing entity 28.

The consumer 18 may be an individual, or an organization such as a business that is capable of purchasing goods or services. Examples of consumers may include credit cardholders, debit cardholders, etc.

The portable consumer device 16 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The portable consumer device 16 may comprise a computer readable medium and a body. The computer readable medium may be on the body. The body may in the form a plastic substrate, housing, or other structure. The computer readable medium may be a memory that stores data and may be in any suitable form. Exemplary computer readable media may be in any suitable form including a magnetic stripe, a memory chip, etc.

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer 28(a), which operates a host site 28(a)-1, as well as a database 28(b) operatively coupled to the server computer 28(a). A "server computer" is typically a powerful computer or cluster of computers. For example, the server computer can be a large mainframe, a minicomputer cluster, or a group of servers functioning as a unit. In one example, the server computer may be a database server coupled to a Web server. The payment processing network 26, like the communication medium 44, may use any suitable wired or wireless network, including the Internet using any suitable communication protocol.

Figure 2A:
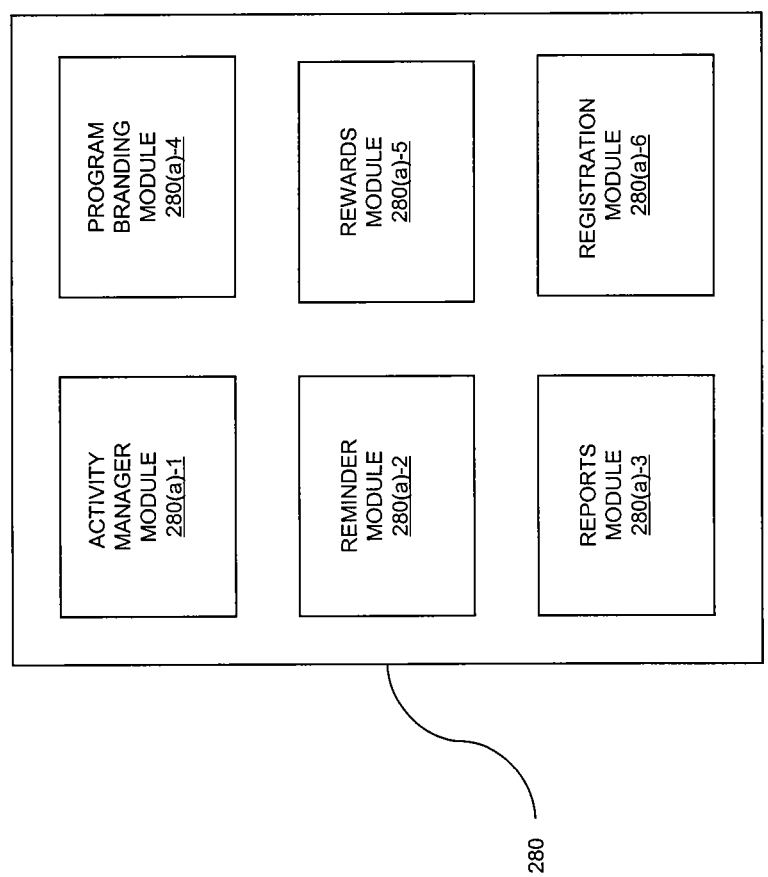
FIG. 2(a) shows a block diagram of exemplary modules that can be present on a server computer operated by a processing organization.

The server computer 28(a) operated by the processing entity 28 may comprise a group 280 of software modules. As shown in FIG. 2(a), examples of suitable modules may include an activity manager module 280(a)-1, a reminder module 280(a)-2, a reports module 280(a)-3, a program branding module 280(a)-4, a rewards module 280(a)-5, and an enrollment module 280(a)-6. Embodiments of the invention may include more or less software modules than are shown in FIG. 2. Further descriptions of the functions performed by the modules shown in FIG. 2 are provided below.

Figure 2B:
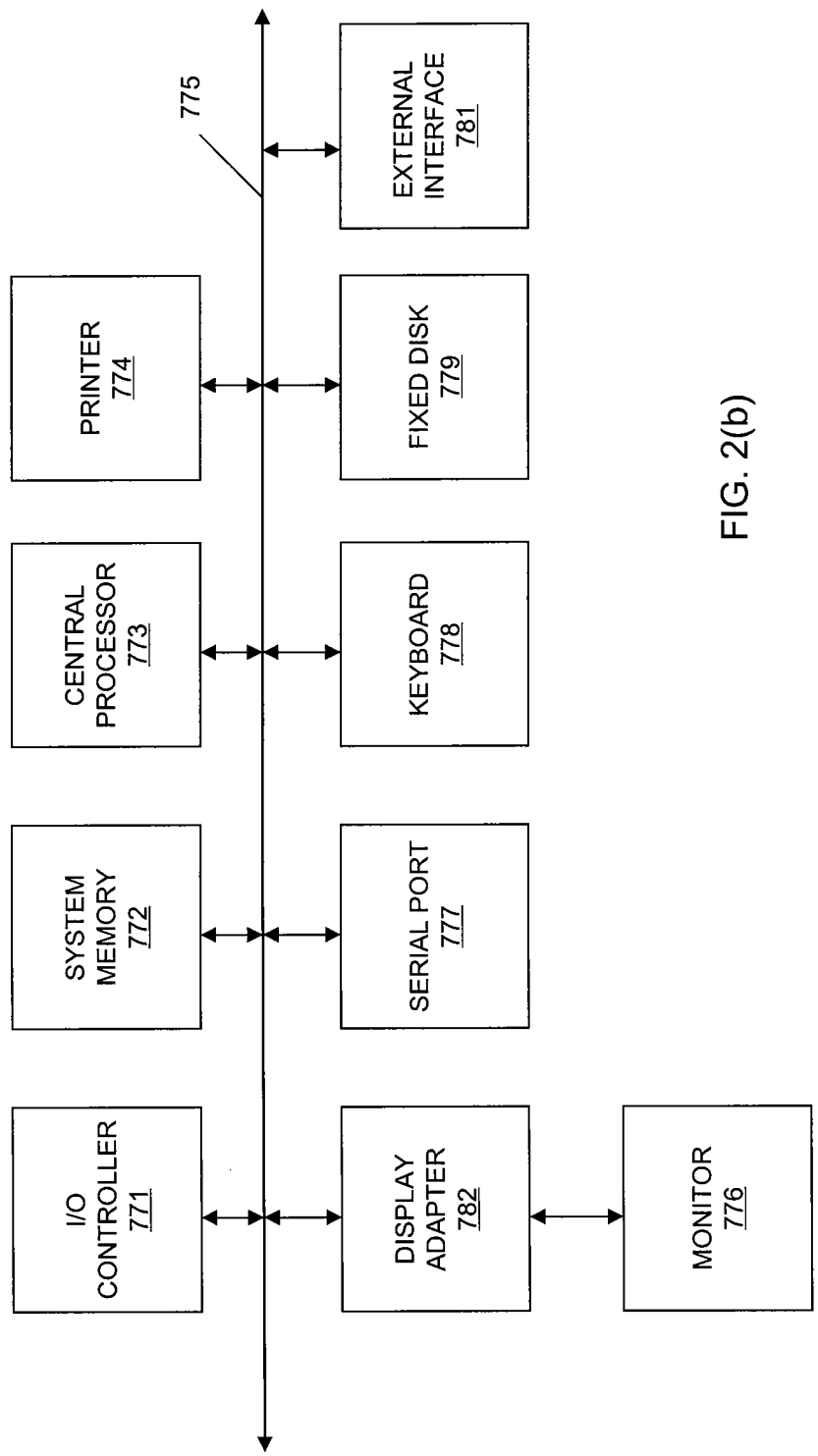
FIG. 2(b) shows a diagram of a computer apparatus.

FIG. 2(b) shows typical components or subsystems of a computer apparatus. Any of the components shown in FIG. 2(b) may be present in the client terminals 22(b), 32(a) or the server computer 28(a). The subsystems shown in FIG. 2(b) are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

A method according to an embodiment of the invention can be described with reference to FIGS. 1-3. The flowchart shown in FIG. 3 specifically illustrates a method including allowing a business entity to register a rewards program associated with portable consumer devices with a processing entity via a host site, selecting a merchant offer that can be associated with one or more portable consumer devices, and then generating a customized offer element that links the registered rewards program and the merchant offer. Modules such as the program branding module 280(a)-4, the registration module 280(a)-6, and other modules may be used to perform the functions in the flowchart in FIG. 3.

An issuer 32 first registers with a processing entity 28. The issuer 32 may use a client terminal 32(a) to contact the host site 28(a)-1 on the server computer 28(a) operated by the processing entity 28 via the communication medium 44. Once on the host site 28(a)-1, the issuer 32 can then register with the processing entity 28 (step 102). The registration module 280(a)-6 in FIG. 2 may comprise computer code for performing any business entity (e.g., issuer) or partner registration functions.

In a first step of the registration process, a wizard can initially request information such as the issuer's legal information. The first step in the wizard may help the issuer define issuer branding elements, assign account ranges to the issuer, and manage mailing seeds (seeds include people who receive offer elements for quality control purposes). The processing entity can use the elements when building proposed offer elements and a mailing list for those offer elements.

FIG. 4 shows a Web page from a business entity wizard. The business entity wizard may allow the issuer to enter or modify issuer information and can guide the issuer through a four step wizard application process. As shown in FIG. 4, information such as the legal name of the issuer, the issuer's business ID, the issuer's business address, and other information may be entered by the issuer 32 using the processing entity's host site 28(a)-1.

In a second step of the registration process, the business entity wizard may provide a "branding elements" page (not shown) that is used in a creative template to brand offers. The issuer needs to ensure that the rewards program branding information and brand assets supplied (i.e., logos and signatures) reflect the appropriate branding requirements for any rewards programs. A branding rich text editor can be used to customize text styles and include special symbols such as a registered trademark, trademark, or copyright service mark. The source icon allows business entities to view or update the underlying HTML source code in case the issuer wants to perform more advanced editing.

A branding elements page may also be present in the rewards program manager. Using the branding elements page, branding can be previewed before proceeding to step three of the wizard.

To preview how the branding information will appear on a rewards program offer, the issuer may select the base branding elements (a sample creative for issuers to view their branding elements) or a preexisting offer from a drop down menu or the like. The issuer 32 may then select the appropriate button to preview the rewards offer that the issuer has defined.

Step three of the registration wizard can show an "account ranges" page (not shown) that can provide two tabs. Selecting the first tab can provide a list of inherited account ranges, while selecting the second tab allows the issuer to assign or edit account ranges from a global account range pool. The assign account ranges tab shows BINs (bank identification numbers) and account ranges, which were created by the processing entity 28 and are available for assignment in the global account range pool. Issuers (e.g., a bank) and partners (e.g., an airline that partners with the bank to provide miles as rewards) can make assignments from this pool.

On a "mailing settings" page, the issuer can assign frequency and other settings (recency settings) for mailing seeds. These settings can apply to all account ranges under the issuer's control. A frequency value determines the maximum number of times per calendar year an account may be targeted by campaigns. A recency value determines the minimum number of days that need to pass after an account is contacted for a campaign, before the account can be contacted for another campaign. For example, the default recency value may be 0, and the maximum may be 30 in some embodiments.

Step four of the registration wizard shows a mailing seeds page and is used to assign mailing seeds, which contain the names and addresses of people (at the issuer and/or partner) who are to receive the offer mailings for quality control purposes. Issuers are allowed to have seeds for the offer mailing process. Issuers can define their own global collections of seeds.

An issuer's seeds are associated with program brand reward program identification numbers or RPINs. When the information is extracted during the offer mailing process, a copy of the offer is sent to the people who are designated as seeds.

Once registered, the issuer 32 may upload account numbers associated with a batch of portable consumer devices to the server computer 28(*a*) operated by the processing entity 28 (step 104). These account numbers may thereafter be stored in the database 28(*b*) (step 104) along with other information such as BINs.

Before or after the issuer 32 registers with the processing entity 26, the merchant 22 can use its client terminal 22(*a*) to send offer information to the processing entity 28 (step 106). In other embodiments, the merchant 22 may send the offer information to the processing entity 28 through some other means including the U.S. mail (non-electronic). Offer information may include the parameters of a particular offer including the reward provided when the portable consumer device 16 is used at the merchant 22, and the conditions of use (e.g., use a credit card at merchant A at least 5 times in a given month to receive a $10 gift card).

Offer information may also include the type of consumer that is to be targeted by the merchant 22 with the offer. For example, the merchant 22 may want to specifically target the issuer's "gold cardholders" to target high income consumers. This merchant target preference may be included in the offer information and may be sent from the merchant 22 to the processing entity 28.

After the processing entity 28 receives the offer information from the merchant 22, the processing entity 28 may then determine the actual target consumers and their associated account numbers (step 108). The server computer 28(*a*) may match the type of consumers preferred by merchant 22 with consumer information (e.g., consumer account numbers) provided by the issuer 32, to create a list of target consumers.

After the merchant 22 sends the offer information to the processing entity 28, the processing entity 28 then posts the offer on the host site 28(*a*)-1 along with other offers from other merchants so that all business entities (e.g., the issuer) that are registered with the processing entity 28 can review the posted offer.

The issuer 32 then reviews the posted merchant offer (step 112). The posted offer may be displayed along with other merchant offers on the issuer's home page on the host site 28(*a*)-1.

At some point in time, there is a conflicts review (step 114) for possible branding conflicts. For example, the merchant 22 that provides the offer could be a potential or actual business competitor of the issuer 118 or its business partner. Any potential conflict can be identified and the registering entity (e.g., the issuer) can be notified before proceeding further.

After the issuer 32 selects a proposed merchant offer, the issuer 32 may cause the server computer 28(*a*) to generate a proposed offer letter (step 116), which is then viewable by the issuer 32. The offer letter may include the parameters of the merchant offer, and may also incorporate branding elements associated with the merchant 22 and the issuer 32, and optionally a partner of the issuer 32. Commercially available software such as Quark DDS may be use to generate the offer letter.

Figure 5:
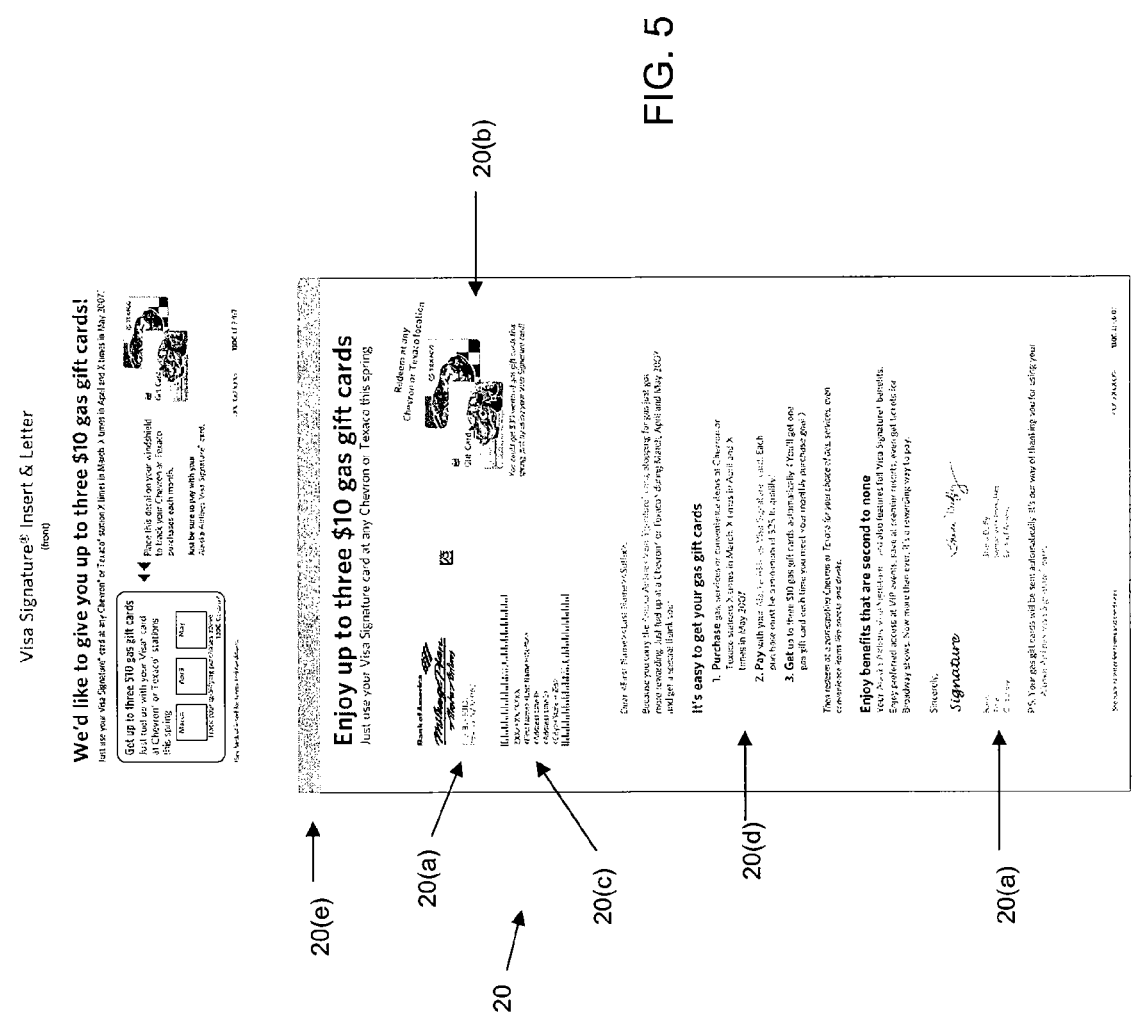

FIG. 5 shows an exemplary offer letter generated according to an embodiment of the invention. As shown in FIG. 5, the offer letter 20 comprises a number of issuer elements 20(*a*) including issuer logos, partner logos, issuer personnel, etc., merchant elements 20(*b*) including merchant logos and tradenames, consumer information 20(*c*) such as the consumer's address, and offer parameters 20(*d*) specifying the conditions of the merchant offer. The offer letter 20 combines merchant elements and issuer elements in a way that customizes the offer letter 20 for the consumer.

After the offer letter 20 is reviewed by the issuer 32, the issuer 32 may then select the merchant offer (step 118), if it is acceptable to the issuer 32. Once the offer letter is approved by the issuer 32, the issuer 32 can initiate the process of mailing the offer letters out to consumers.

The processing entity 28 then determines the recipients of the offer letter (step 120), and then contacts the mailing entity 30. The mailing entity 30 may be a mail house or other suitable entity configured to mail out letters after receiving instructions from the processing entity 28. In other embodiments, the mailing entity 30 could send faxes, e-mails, or any other type of offer element.

The mailing entity 30 then mails the offer letters to the targeted consumers (step 122). As noted above, instead of mailing the offer letter, the offer letter would alternatively be an e-mail or some form of electronic communication. In addition, in some cases, the mailing entity 30 is not needed and the function of mailing the offer letter 20 could be performed by the processing entity 28.

Figure 6:
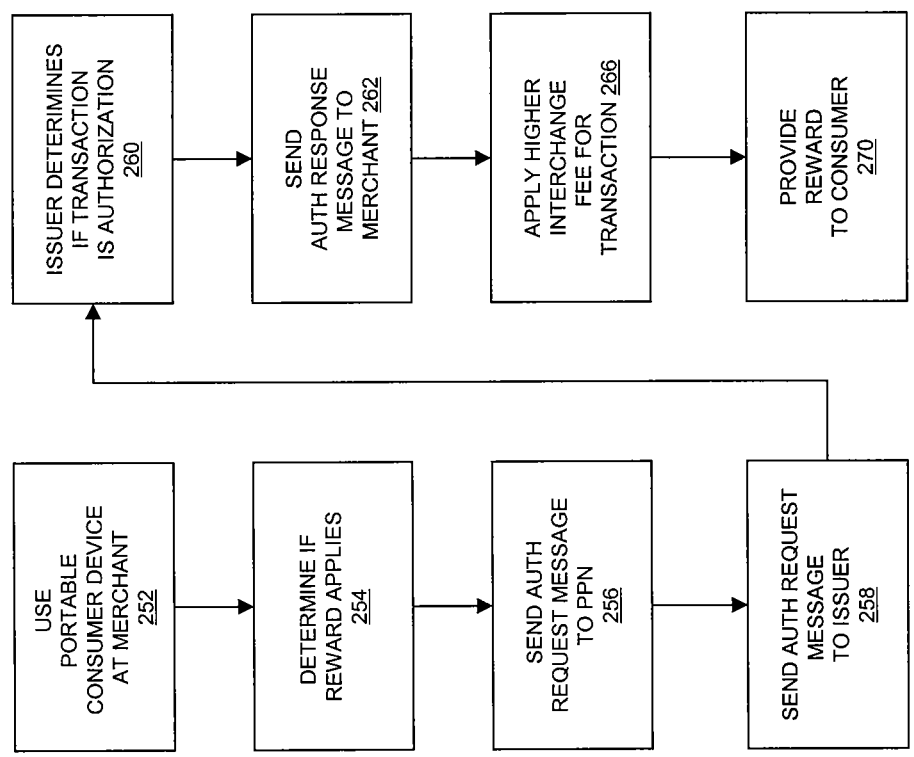
FIG. 6 shows a flowchart illustrating a method for a reward process according to an embodiment of the invention.

FIG. 6 shows a flowchart illustrating a method for a reward process, which can occur after the consumer receives the offer letter 20. The previously described rewards module 280(*a*)-5 in FIG. 2 may be used to perform at least some of the functions in FIG. 6.

After a consumer's portable consumer device 16 is registered with a particular offer campaign associated with the merchant 22, the consumer 18 may use the portable consumer device 16 at the merchant 22 to buy goods or services (step 252). For example, the portable consumer device 16 may be a credit card, and the consumer 18 may swipe his credit card through the access device 22(*a*) at the merchant 22. The merchant 22 may determine if a reward applies (step 256), and this information may be stored at the merchant 22 and/or may be sent to the processing entity 28.

The access device 22(*a*) then sends an authorization request message to the issuer 32 via the payment processing network 26 and the acquirer 24 (step 256). The authorization request message requests authorization from the issuer 26 to conduct the transaction. The request to proceed with the transaction can be denied if the consumer 18 does not have sufficient funds or credit with the issuer 32. On the other hand, the request may be approved if the consumer does have sufficient funds or credit with the issuer 32.

The processing entity 28 may then forward the authorization request message on to the issuer 32 (step 258). Using the server computer 23(*a*) and the consumer information stored in the database 28(*b*), the processing entity 28 may identify the transaction as being entitled to a reward, and may store information about the transaction (e.g., the amount of the transaction, the name of the merchant 22, the date and time of the transaction, the account number of the portable consumer device 16, etc.) in the database 28(*b*). The transaction information may be accumulated and stored in the database 28(*b*), and may be transmitted at some point to the merchant 22 (if the merchant 22 has not already collected it) so that the merchant can send or provide earned rewards to the consumer 18.

Alternatively or additionally, the merchant 22 may also keep track of transactions conducted by the consumer 18, so that the merchant 22 may provide earned rewards to the consumer 18. For example, the merchant 22 may provide a gift card or other reward to the consumer 18 after the consumer 18 has complied with the parameters of the merchant offer.

In addition, if the issuer 32 does not keep track of its own consumer transaction information, the processing entity 28 may provide transaction information to the issuer 32 so that the issuer 32 can provide any appropriate rewards to the consumer 18. For example, the consumer 18 may have accrued airline miles for his use of the portable consumer device 16. The airline miles would be provided by the issuer's partner (e.g., an airline) or the issuer (e.g., a bank) itself.

The database 28(*b*) may store historical transaction data for a plurality of consumers using different portable consumer devices. This historical transaction data may show how issuers and merchants how effective their rewards programs and/or offer campaigns are. This feedback can be provided to the issuer 32 or the merchant 22 through the host site 28(*a*)-1, and can show issuers and merchants how effective their rewards programs and offer campaigns are.

The issuer 32 then determines if the consumer 18 is authorized to make the purchase (step 260), and then sends an authorization response message back to the merchant 22. The authorization response message will indicate whether or not the transaction is approved or denied.

At the end of the day, a clearing and settlement process is then performed. The clearing and settlement process involves the acquirer 24, the payment processing network 26, the processing entity 28, and the issuer 32. In a clearing and settlement process, the payment processing network 28 consolidates various transactions between different acquirers and issuers and settles accounts among them. Actual funds can be transferred during the clearing and settlement process. This process is usually completed within two or three days from the date that a purchase is made by a consumer. The consumer 18 is then subsequently billed for the purchase in a periodic statement of the consumer's account.

Since the portable consumer device 16 was enrolled with the rewards program manager, a higher interchange rate is applied to the transaction (step 266). The merchant 22 may be required to pay a higher interchange rate for transactions that qualify for merchant offers, since the merchant 22 experiences a higher volume of transactions as a result of the merchant offer campaign. For example, a transaction conducted according to a merchant offer may result in a 2% fee to the merchant 22, while a transaction not conducted according to the merchant offer may result in a 1% fee to the merchant 22.

A reward may be subsequently provided to the consumer 18 (step 270). As noted above and below, the reward can be in any suitable form including a gift card, cash back, etc.

FIGS. 7-20 show various screenshots that can be displayed on the host site (e.g., a Web site). The screenshots illustrate the functionality of the host site, and illustrates how the host site can help a business entity such as an issuer manage rewards programs.

FIG. 7 shows a home page. The information on the home page is customized to business entity roles and provides a view of activities and statuses, offer timelines, reminders for scheduled offers, and news items.

The "My Activities" section 206 of the home page is located at the top of the home page. Activities are generated by the processing entity when branding changes or new branding elements need approval and require the issuer's attention to complete or resubmit to the processing entity. Depending on how many activities pertain to a particular rewards program, the issuer may see no activities, or up to 10 of the most recent activities on the home page. The processing entity generates activities which are sorted by date in the order that they were created. My Activity is used to view or work on the activities pertaining to the issuer's rewards program.

The home page also has a section 202 for merchant offers. Here, there are three merchant offers that the issuer may review and possibly select. The merchant offers may be associated with certain timeframes (e.g., when the offer campaigns will start and stop, when the offer campaigns can be accepted or used by issuers, etc.). Also, a number of different issuers may view the merchant offer campaigns and may review them before participating in them. As noted above, offer letters including the offer parameters, merchant identifiers, and issuer identifiers, may be generated and previewed by the issuer, before the issuer actually decides to participate in a particular merchant offer campaign.

The home page also has a section with reminders 204. The reminder section and functionality are described in further detail below. The functions performed in the reminder section may be performed by the previously described reminder module (280(*a*)-2 in FIG. 2).

FIG. 8 shows a Web page listing all of an issuer's pending activities. The issuer may click the "Activity Manager" link from the home page (in FIG. 7) to view a complete list of activities. Various activities (e.g., request for branding approval due to name change) that are conducted in conjunction the issuer's rewards programs can be monitored in this Web page. The activities can appear in the order in which they were generated, from oldest to newest. Activities can also be sorted and grouped by date created, activity, and status. The issuer may click an activity's link to view the activity details. These activity manager functions can be performed by the activity manager module (280-(*a*)-1 in FIG. 2).

Activities can show one of the following statuses: "Approved"—No further action is required; click complete to remove the activity from the list. "Pending"—The information has been submitted to the processing entity for approval. Unapproved—The processing entity did not approve of the information. In this latter case, the issuer may open the activity to find out why the information was not approved, may make any desired changes, and may resubmit the activity to the processing entity.

The issuer may click on any specific activity link from the home page or the activity manager page to review a description of a given activity and any comments that the processing entity may have sent. If an activity is approved, it may review the approval and a complete button may be selected to remove the activity from the list. If there is an action that is required by the issuer and the issuer fulfills the action, then the activity may be removed from the list. Based on the issuer's action, another activity may be generated by the processing entity.

Figure 9:
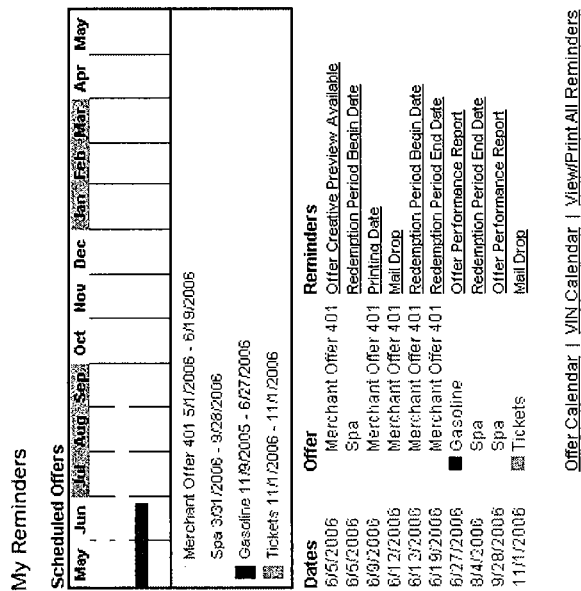
FIG. 9 shows a Web page with reminders.

FIG. 9 shows a Web page showing reminders. The host site may include a "my reminders" section that can be located on the left side of the home page shown in FIG. 7. Reminders provide a graphical and textual list of offer-related events for the issuer's information and attention. Reminders can be automatically added to this list when an offer event appears on the calendar. An offer event may be a milestone in an offer campaign. Examples of offer events may include the start and stop date of an offer campaign, when offer letters will be mailed, etc. If an offer event changes, the reminder date may automatically change. The illustrated Web page may also be used to view or organize the reminders pertaining to all available offers.

The following business entity functions may be in the reminders section of the home page of the host site. The reminders section displays individual reminder links that provide additional detailed information about the event. The offer calendar link can provide a one month view of the events calendar when the issuer clicks on the offer calendar link. The offer calendar data are driven by offers in the rewards program manager. This information includes all the key event dates for the offers in which the issuer is participating. Events appear on the calendar at a designated time and remain on the calendar for a designated number of days. Event timeframes can be set when the event is defined and can vary in length. An incentive network calendar link provides an offer event report that lists each offer with detailed information and key dates pertaining to each offer.

There may also be a view/print/all reminders link, which opens another window and displays a list of all reminders pertaining to available offers. The list of reminders can be sorted and grouped by date, name, or offer.

The host site may also include a "reports" section, which is customized based on business entity roles and responsibilities. To access a report, the issuer may click on any of the report links labeled after each report name on the Web page in FIG. 10. Exemplary reports include a registration summary report, an offer participation report, a program report, an account ranges report, an incentive network calendar, and a program brand branding and participation summary report. The above-described reports module (see 280(*a*)-3 in FIG. 2) may be used to perform report functions.

The host site may also comprise a Web page that will allow a business entity to manage business partners. The manage business partners page lists all related partners (issuers, co-brands, and processors) that are currently registered in the incentive network. This is where the issuer can register a new business entity or change an entity's information. The issuer may also add a partner's legal information, define branding elements, assign account ranges, and assign mailing seeds.

The host site may also allow an issuer to register new programs. The "manage programs" page lists the programs that the issuer has registered with the rewards program manager. To register a new program, the issuer may click an "add new program" link on a "manage program" page.

Each program is either active or inactive. When a program is active, a "suspend" link may be displayed. To suspend a program, the issuer may click the suspend link, which will toggle the link to "restore." To restore a suspended program, click the restore link which will toggle the link to suspend. To sort program data, the issuer may click a column heading and the information may be displayed in ascending/descending order.

Each rewards program may have a unique set of detail data, such as program name and redemption type, and can serve as a basis for more than one program brand. The issuer may click on the "add new program" link to access a program wizard. The program wizard will take the issuer through the steps needed to register a program with the processing entity.

There can be a number of steps that are needed to complete when adding a program. FIGS. 11-19 illustrate steps that can be performed when adding a program to the rewards manager.

A "details" step identifies the entity responsible for administering a program and allows one to select the type of product (e.g., a class of portable consumer devices), program, rewards currency (rewards points) and other details for a unique program. Referring to FIGS. 11-12, the issuer may enter its name into the rewards program manager and other detailed information about the entity in the rewards program manager. When the issuer has entered all the required information, the issuer may click a save and continue button to proceed on to the next page.

Figure 13:
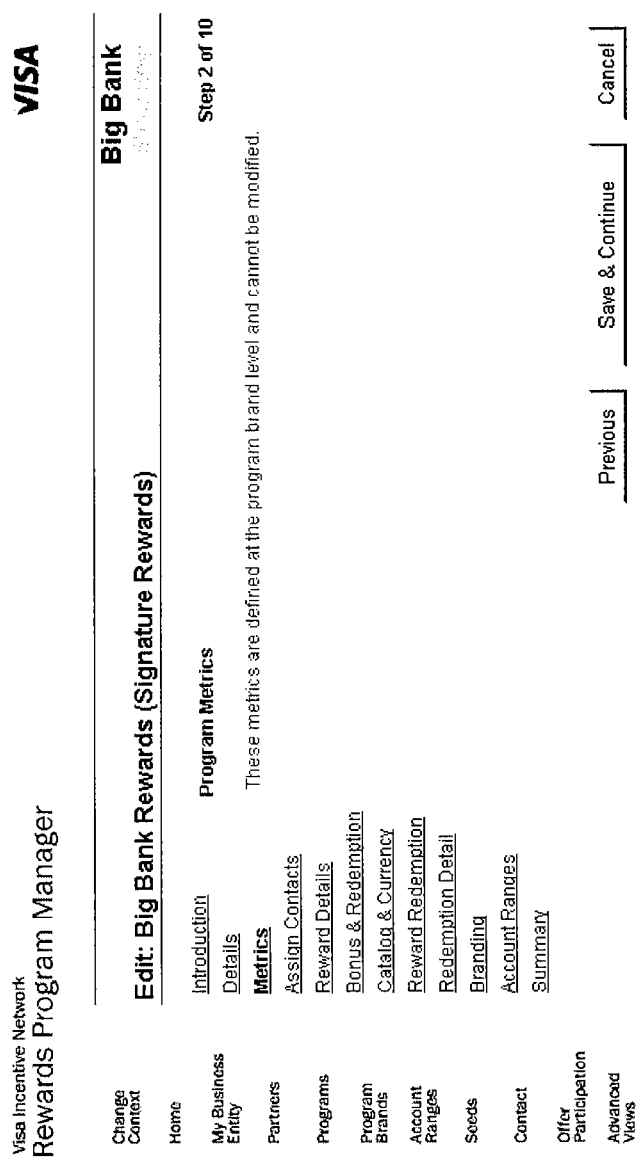
FIG. 13 shows a Web page that allows an issuer to specify metrics associated with a proposed rewards program.

Referring to FIG. 13, a metrics step contains current and projected rewards metrics data. This information is used for measurement and analysis purposes, and also can be used to project growth. Metrics can be defined for a program or program brand, but not for both. For example, if the issuer defines specific metrics at the program level, the issuer may not be able to edit those metrics for a program brand based on that program. However, if the issuer does not define the metrics at the program level, the issuer can define the metrics for each program brand that is based on that program. Although the issuer preferably enters the metrics at the program or program brand level, the issuer can continue using the wizard without entering information on this page. When the issuer has entered all the required information, the issuer may select a save and continue button to proceed on to the next page.

Figure 14:
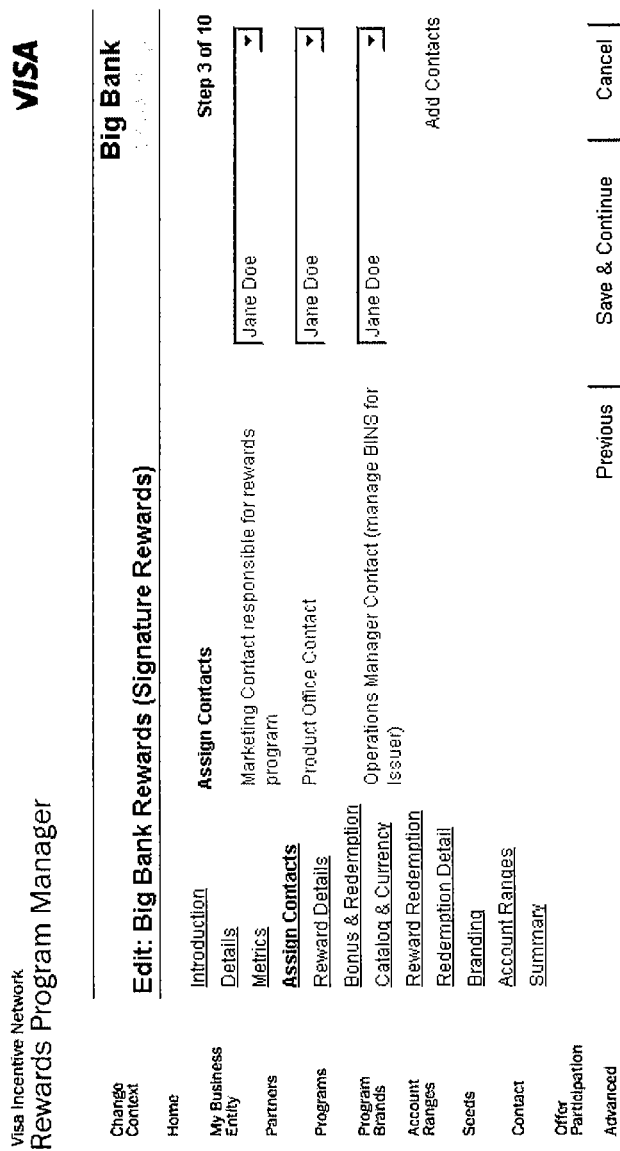
FIG. 14 shows a Web page that allows an issuer to assign contacts for a reward program.

Referring to FIG. 14, an assign contacts step allows the issuer to enter individual or company contact information for the following departments: marketing contact, product office contact, and operations manager contact. If the contact person that the issuer wants to assign does not appear in the drop-down list, the issuer may click an "add contacts" button and may complete an online form. When the issuer has entered all the required information, the issuer may click a save and continue button to proceed on to the next page.

Referring to FIG. 15, the rewards details step specifies whether: the rewards program is tiered; the rewards currency expires; there are caps on the currency earned; and/or the designed programs allow for tiered earning structures. When the issuer has entered all the required information, the issuer may click a save and continue button to proceed on to the next page.

Referring to FIG. 16, the bonus and redemption step designates the types of bonuses and redemption options that are available to the consumer. Examples of such options include cash back, gift cards, gift certificates, and merchandise. A list of categories may appear if the program offers bonuses to cardholders for spending in specific categories. If the issuer selects a "merchants" category, the issuer may specify the names of the merchants in the space provided. When the issuer has entered all the required information, the issuer may click a save and continue button to proceed on to the next page.

Referring to FIG. 17, the catalog and currency step specifies how consumers can redeem rewards and how they will be notified of their rewards currency. The rewards currency notification includes the rewards currency earned and redeemed, and the remaining balance. Some consumers may want to be notified of their rewards currency at some predetermined time interval (e.g., at least once annually, or at least once per quarter). When the issuer has entered all of the required information, the issuer may then select a save and continue button to proceed on to the next page.

Referring to FIG. 18, the reward redemption step allows the issuer to choose a redemption option for a particular reward program type. Examples of redemption options include air travel, cash, gift cards, and gift certificates. The information and options that the issuer sees on the following redemption details page (FIG. 19) is based on the selection made on this page. When the issuer has entered all the required information, the issuer may click a save and continue button to proceed on to the next page.

Referring to FIG. 19, the redemption detail step defines the redemption rules for the reward redemption option selection in FIG. 18 (air travel, cash equivalency, and merchant-specific gift certificates and gift cards). If this is not the correct redemption option, then one may select a previous button on the bottom of the page to return to the reward redemption step and select another option. When the issuer has entered all the required information, the issuer may select a save and continue button to proceed on to the next page.

Embodiments of the invention may also include a branding step. The branding step defines branding elements that are specific to this level of the program wizard process. The information supplied on a branding page can be used in a creative template to brand offers.

The account ranges step allows the issuer to view a list of inherited BINs or assign account ranges. Each BIN on the inherited account ranges tab has an icon representing the level from which it was inherited. BINs assigned at higher hierarchy levels will automatically be inherited at lower levels. Mixed BINs are available for traditional programs, signature programs, and preferred signature programs or program brand account ranges.

The final page of the program wizard process can be the summary page, which confirms whether the issuer successfully completed the wizard processes and may include additional information or reminders. Any document downloads, if applicable, are also listed here.

Figure 20:
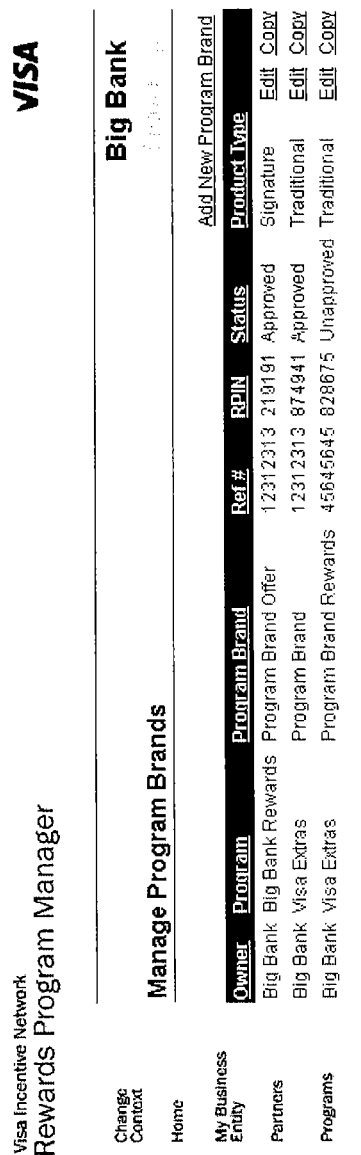
FIG. 20 shows a manage program brands Web page.

The rewards program manager may also allow an issuer to manage program brands. Referring to FIG. 20, the manage program brands page displays a list of programs and brands. To sort a program brand's data, the issuer may click a column heading and the information will be displayed in ascending order. The issuer may also click the column heading again to display the data in descending order. To change the brand's information, the issuer may click the program brand's edit link. To create a new program brand based on an existing one, the issuer may click the copy link for the existing program brand. To add a new program brand, the issuer may select an "add new program brand" link, located on the manage program brands page.

The issuer may add a new program brand by selecting an "add new program brand" link to access the program brand wizard. The program brand wizard may contain four steps: program brand details; program brand metrics; program brand branding; and program brand account ranges. After all steps are completed and saved, a summary page appears. The issuer may read the summary page, check the submit button for approval by the processing entity and then select save and complete buttons to submit the contents of the wizard to the rewards program manager.

The program brand details step allows the issuer to select an existing program as a base of the new program brand to reduce the amount of data entry. When the issuer creates a program brand by copying an existing brand, most of the fields on this page will be populated automatically; however, the issuer may need to edit the brand name field.

Once the program brand wizard is submitted and the processing entity verifies that all of the requirements have been met for program brand qualification, the processing entity assigns a rewards program identification number (RPIN). The "unassigned" status of the RPIN is then replaced with the assigned RPIN.

The brand metrics step contains current and projected rewards metrics. This information is used for measurement and analysis purposes, and can also be used to project growth of the rewards program over time.

The issuer can define metrics for a program or a program brand, but may not be able to do so for both. For example, if the issuer defines the metrics at the program level, the issuer may not be able to edit the metrics for a program brand based on that program. However, if the issuer does not define the metrics at the program level, the issuer can define the metrics for each program brand that is based on that program. Although the issuer can enter the metrics at the program or program brand level, the issuer can continue using the wizard without entering information on this page.

The branding contains the branding elements that are specific to this level of the program brand wizard process. The information supplied on this page is used in a creative template to brand offers. When the issuer has entered all the required information, the issuer may click save and continue to proceed on to the next page.

The account ranges step allows the issuer to view a list of inherited BINs or assign account ranges. Each BIN on the inherited account ranges tab has an icon representing the level from which it was inherited. BINs assigned at higher hierarchy levels will automatically be inherited at lower levels. Mixed BINs are available for traditional programs, signature programs, or preferred signature programs, or program brand account ranges.

The final page of the program brand wizard process is the summary page that confirms whether the issuer successfully completed the wizard processes and may include additional information or reminders. Any document downloads, if applicable, are also listed here. After all steps are completed and saved, a summary page appears. The issuer reads the summary and selects the submit for approval box, and then clicks save and complete buttons to submit the contents of the wizard to the rewards program manager.

The host site may also include a seeds page. Marketing seeds can organize a direct mail campaign from design of the content to identifying and sourcing the potential customer contact details. The seeds page contains the names and addresses of people (at issuer and/or partner) who are to receive offer mailings for quality control purposes. To delete or edit an existing seed, the issuer may click on an edit or delete link and follow prompts. To add a new seed, the issuer may click an "add mailing" seed link. To sort seeds data, the issuer may click a column heading and the information may be displayed in ascending order. The issuer may click the column heading again to display the data in descending order.

A manage offer participation page on the host site allows the issuer to view the program brands participating in an offer, opt out of an offer, and view branding for an offer (if available). For example, if an issuer makes a conflicting offer to its customer base during the same promotional period, or has a conflict related to an existing co-brand relationship, the issuer may opt out of the offer and exempt some or all of its consumers from the offer.

Embodiments of the invention have a number of advantages. First, embodiments of the invention allow business entities such as issuers to manage their rewards programs and also review merchant offers in a user-friendly and paperless way. Issuers can update registered and approved rewards programs as they change to ensure programs are in compliance. Second, embodiments of the invention can allow an issuer to review offer elements before they are sent out. Sometimes, issuers may not want to participate in an offer if the offer letters that are generated do not look satisfactory to them. Using embodiments of the invention, issuers may preview customized offer letters before they commit to participating in any offer campaigns.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
    a computer system registering a first business entity with a rewards program manager that is executing on the computer system at a host site, the rewards program manager being operated by a second business entity;
    the computer system receiving from the first business entity, a consumer list comprising information identifying a plurality of consumers;
    the computer system enabling second business entity to manage multiple rewards programs associated with at least the first business entity at the host site at least in part by, prior to offering at least one of the rewards programs:
        presenting, to the first business entity, a set of rewards program qualification criteria including one or more minimum qualification criteria to be satisfied by the at least one of the rewards programs in order for the at least one of the rewards programs to be accepted by the rewards program manager operated by the second business entity;
        receiving, from the first business entity, a specification of the at least one of the rewards programs; and
        verifying, by the computer system, that the at least one of the rewards programs is in accordance with the set of rewards program qualification criteria including comparing the specification of the at least one of the rewards programs with the one or more minimum qualification criteria;
    the computer system generating offer messages to be sent to one or more consumers in the consumer list, wherein one or more of the rewards programs are offered to the one or more consumers by way of the offer messages; and
    the computer system initiating sending of the offer messages to each of the one or more consumers in the consumer list.

2. A non-transitory computer readable medium having stored thereon computer program code comprising:
    computer program instructions configured at least to cause at least one data processor to register a first business entity with a rewards program manager operated by a second business entity;
    computer program instructions configured at least to cause the at least one data processor to receive from the first business entity, a consumer list comprising information identifying a plurality of consumers;
    computer program instructions configured at least to cause the at least one data processor to enable the second business entity to manage multiple rewards programs associated with at least the first business entity using the rewards program manager at least in part by, prior to offering at least one of the rewards programs:
        presenting, to the first business entity, a set of rewards program qualification criteria including one or more minimum qualification criteria to be satisfied by the at least one of the rewards programs in order for the at least one of the rewards programs to be accepted by the rewards program manager operated by the second business entity;

receiving, from the first business entity, a specification of the at least one of the rewards programs; and verifying, by the computer system, that the at least one of the rewards programs is in accordance with the set of rewards program qualification criteria including comparing the specification of the at least one of the rewards programs with the one or more minimum qualification criteria;

computer program instructions configured at least to cause the at least one data processor to generate offer messages to be sent to one or more consumers in the consumer list, wherein one or more of the rewards programs are offered to the one or more consumers by way of the offer messages; and computer program instructions configured at least to cause the at least one data processor to initiate sending of the offer messages to each of the one or more consumers in the consumer list.

3. A server computer comprising the computer readable medium of claim 2.

4. A system comprising:

at least one computer, operating at a host site, configured to, at least:

register a first business entity with a rewards program manager operated by a second business entity;

receive from the first business entity, a consumer list comprising information identifying a plurality of consumers;

enable the second business entity to manage multiple rewards programs associated with at least the first business entity at the host site at least in part by, prior to offering at least one of the rewards programs:

presenting, to the first business entity, a set of rewards program qualification criteria including one or more minimum qualification criteria to be satisfied by the at least one of the rewards programs in order for the at least one of the rewards programs to be accepted by the rewards program manager operated by the second business entity;

receiving, from the first business entity, a specification of the at least one of the rewards programs and verifying, by the computer system, that the at least one of the rewards programs is in accordance with the set of rewards program qualification criteria including comparing the specification of the at least one of the rewards programs with the one or more minimum qualification criteria;

generate offer messages to be sent to one or more consumers in the consumer list, wherein one or more of the rewards programs are offered to the one or more consumers by way of the offer messages; and initiate sending of the offer messages to each of the one or more consumers in the consumer list.

5. A method comprising:

a business entity computer providing information to a host site to register with a rewards program manager running on the host site, the business entity computer being operated by a first business entity and the rewards program manager being operated by a second business entity, the rewards program manager comprising computer-executable instructions executed by at least one computer;

the business entity computer, subsequent to registering, providing a consumer list to the rewards program manager;

the business entity computer managing multiple rewards programs at the host site at least in part by, prior to at least one of the rewards programs being offered:

receiving, from the rewards program manager, a set of rewards program qualification criteria including one or more minimum qualification criteria to be satisfied by the at least one of the rewards programs in order for the at least one of the rewards programs to be accepted by the rewards program manager operated by the second business entity;

providing, to the rewards program manager, a specification of the at least one of the rewards programs; and receiving verification, performed by the rewards program manager, that the at least one of the rewards programs is in accordance with the set of rewards program qualification criteria including that the specification of the at least one of the rewards programs complies with the one or more minimum qualification criteria; and the business entity computer initiating generation of offer messages to be sent to one or more consumers in the consumer list, wherein one or more of the rewards programs are offered to the one or more consumers by way of the offer messages.

6. A system comprising:

at least one computer configured to, at least:

provide information to a host site to register itself with a rewards program manager running on the host site, the at least one computer being operated by a first business entity and the rewards program manager being operated by a second business entity, the rewards program manager comprising computer-executable instructions executed by at least one computer;

provide, subsequent to registering, a consumer list to the rewards program manager;

manage multiple rewards programs at the host site at least in part by, prior to at least one of the rewards programs being offered:

receiving, from the rewards program manager, a set of rewards program qualification criteria including one or more minimum qualification criteria to be satisfied by the at least one of the rewards programs in order for the at least one of the rewards programs to be accepted by the rewards program manager operated by the second business entity;

providing, to the rewards program manager, a specification of at least one of the rewards programs; and receiving verification, performed by the rewards program manager, that the at least one of the rewards programs is in accordance with the set of rewards program qualification criteria including that the specification of the at least one of the rewards programs complies with the one or more minimum qualification criteria; and initiate generation of offer messages to be sent to one or more consumers in the consumer list, wherein one or more of the rewards programs are offered to the one or more consumers by way of the offer messages.

7. A method comprising:

a business entity computer, operated by a first business entity, receiving a plurality of offers from a plurality of merchants at a host site, wherein the offers are associated with rewards to consumers after the consumers use their portable consumer devices;

the business entity computer facilitating management of at least one rewards program at the host site at least in part by, prior to at least one of the rewards programs being offered:

receiving, from a rewards program manager running on the host site, a set of rewards program qualification criteria including one or more minimum qualification criteria to be satisfied by the at least one of the rewards programs in order for the at least one of the rewards programs to be accepted by the rewards program manager operated by a second business entity;

providing, to the rewards program manager, a specification of the at least one rewards program at least in part by indicating selection of at least one offer from the plurality of offers; and receiving verification, performed by the rewards program manager, that the specified at least one rewards program is in accordance with the set of rewards program qualification criteria including that the specification of the at least one of the rewards programs complies with the one or more minimum qualification criteria;

the business entity computer receiving a generated customized offer element including the offer and an identifier of the first business entity; and the business entity computer initiating sending of the customized offer element to each of one or more consumers selected from among a plurality of consumers.

8. A method comprising:

a computer system, operated by a first business entity, providing for a plurality of offers from a plurality of merchants at a host site, wherein the offers are associated with rewards provided to consumers after the consumers use their portable consumer devices;

the computer system facilitating management of at least one rewards program including facilitating specification of the at least one rewards program at least in part by, prior to offering the at least one rewards program:

presenting, to a second business entity, a set of rewards program qualification criteria including one or more minimum qualification criteria to be satisfied by the at least one rewards program in order for the at least one rewards program to be accepted by a rewards program manager operated by the first business entity;

receiving, from the second business entity, a specification of the at least one rewards program; and providing verification, performed by the rewards program manager executing at the host site, that the specified at least one rewards program is in accordance with the set of rewards program qualification criteria including that the specification of the at least one rewards program complies with the one or more minimum qualification criteria;

the computer system generating a customized offer element including a selected offer of the plurality of offers and an identifier of the second business entity;

the computer system determining one or more consumers from among a plurality of consumers; and the computer system initiating sending the customized offer element to each of the one or more consumers from among the plurality of consumers.

9. A method comprising:

a business entity computer, operated by a first business entity, receiving via the Internet a plurality of offers from a plurality of merchants stored at a host site, wherein the offers are associated with rewards provided to consumers after the consumers use their portable consumer devices;

the business entity computer facilitating management of at least one rewards program at the host site at least in part by, prior to offering the at least one rewards program:

receiving, from a rewards program manager executing at the host site, a set of rewards program qualification criteria including one or more minimum qualification criteria to be satisfied by the at least one rewards program in order for the at least one rewards program to be accepted by the rewards program manager operated by the first business entity;

providing, to the rewards program manager, a specification of the at least one rewards program at least in part by indicating selection of at least one offer from the plurality of offers and receiving verification, performed by the rewards program manager, that the specified at least one rewards program is in accordance with a set of rewards program qualification criteria including that the specification of the at least one rewards program complies with the one or more minimum qualification criteria;

the business entity computer receiving a generated a customized offer element including the offer and an identifier of the first business entity; and the business entity computer initiating sending of the customized offer element to each of one or more consumers selected from among a plurality of consumers.

10. The method of claim 1, wherein the one or more minimum qualification criteria comprises one or more criteria with respect to a financial value provided by the at least one of the rewards programs to the plurality of consumers.

11. The method of claim 1, wherein the at least one of the rewards programs has a plurality of program brands beneath the at least one of the rewards programs in a hierarchy as specified by the first business entity and verification by the rewards program manager with respect to the rewards program qualification criteria occurs at the rewards program level of the hierarchy.

12. The method of claim 11, wherein at least one of the plurality of program brands that are beneath the at least one of the rewards programs in the hierarchy is caused to inherit one or more details of the at least one of the rewards program by the rewards program manager.

13. The method of claim 1, wherein the second business entity corresponds to a payment processing entity that, at least, provides the set of rewards program qualification criteria and determines rewards in accordance with the at least one of the rewards programs based at least in part on payment authorization requests submitted to the payment processing entity.

14. The method of claim 10, wherein the financial value provided by the at least one of the rewards programs is specified at least in part by a number of basis points with respect to a financial amount spent in relation to the at least one of the rewards programs.

15. The method of claim 11, wherein the hierarchy comprises at least four hierarchy levels including a first business entity level, a second business partners level, a third rewards program level and a fourth program brands level.

16. The method of claim 15, wherein entities in the second business partners level inherit one or more details from the first business entity level, entities in the third rewards program level inherit one or more details from the first business entity level or the second business partners level, and entities in the fourth program brands level inherit one or more details from the first business entity level, the second business partners level or the third rewards program level.

17. The method of claim 15, wherein the host site maintains a wizard type graphical user interface for each level of the hierarchy, each wizard type graphical user interface configured at least to facilitate entry of details defining entities in the corresponding hierarchy level.

18. The method of claim 17, wherein at least one of the wizard type graphical user interfaces is further configured at least to cause entities in the corresponding hierarchy level to inherit details from parent entities in a higher level of the hierarchy.

19. The method of claim 17, wherein the wizard type graphical user interface corresponding to the third rewards program level is further configured at least to present the set of rewards program qualification criteria and receive, with a plurality of graphical user interface fields, data corresponding to at least a portion of the specification of said at least one of the rewards programs.

20. The method of claim 1, further comprising assigning the at least one of the rewards programs at least one rewards program identification number (RPIN) when the at least one of the rewards programs is verified by the computer system as in accordance with the set of rewards program qualification criteria.

\* \* \* \* \*

UNITED STATES PATENT AND TRADEMARK OFFICE
CERTIFICATE OF CORRECTION

| | | |
|---|---|---|
| PATENT NO. | : 8,682,719 B2 | Page 1 of 1 |
| APPLICATION NO. | : 11/688423 | |
| DATED | : March 25, 2014 | |
| INVENTOR(S) | : Jodene Laramy et al. | |

It is certified that error appears in the above-identified patent and that said Letters Patent is hereby corrected as shown below:

In the Claims

In claim 1, column 16, line 18, after "enabling" insert --the--;
In claim 9, column 20, line 11, after "offers" insert --;--;
In claim 9, column 20, line 18, after "generated" delete "a".

Signed and Sealed this
Fifth Day of May, 2015

Michelle K. Lee
*Director of the United States Patent and Trademark Office*